(12) United States Patent
Taylor

(10) Patent No.: US 11,623,704 B2
(45) Date of Patent: Apr. 11, 2023

(54) RETRACTABLE ON-BOARD VEHICLE TRAILER

(71) Applicant: Robert Taylor, Boxford, MA (US)

(72) Inventor: Robert Taylor, Boxford, MA (US)

( * ) Notice: Subject to any disclaimer, the term of this patent is extended or adjusted under 35 U.S.C. 154(b) by 0 days.

(21) Appl. No.: 17/350,083

(22) Filed: Jun. 17, 2021

(65) Prior Publication Data

US 2021/0394843 A1    Dec. 23, 2021

Related U.S. Application Data

(60) Provisional application No. 63/040,047, filed on Jun. 17, 2020.

(51) Int. Cl.
*B62D 63/06* (2006.01)

(52) U.S. Cl.
CPC ......... *B62D 63/061* (2013.01); *B62D 63/062* (2013.01)

(58) Field of Classification Search
CPC ............................ B62D 63/061; B62D 63/062
See application file for complete search history.

(56) References Cited

U.S. PATENT DOCUMENTS

| | | | | |
|---|---|---|---|---|
| 4,362,316 A * | 12/1982 | Wright | ................ | B62D 63/061 280/493 |
| 4,746,142 A * | 5/1988 | Davis | ................... | B62D 63/061 280/37 |
| 4,786,073 A * | 11/1988 | Harper | ................. | B62D 63/061 280/491.1 |
| 5,354,090 A * | 10/1994 | Grovom | ............... | B62D 63/061 280/638 |
| 5,647,064 A | 7/1997 | Russell | | |
| 6,254,117 B1 * | 7/2001 | Cross | ................... | B62D 63/062 280/491.1 |
| 6,834,882 B1 * | 12/2004 | Boyd | ..................... | B60P 3/122 280/789 |
| 7,543,842 B1 * | 6/2009 | Fiorini | .................... | B62B 3/025 280/43 |
| 7,780,185 B2 * | 8/2010 | McConkey | .......... | B62D 63/061 280/30 |
| 8,157,288 B2 * | 4/2012 | Kapels | ..................... | B60D 1/46 280/491.1 |

(Continued)

FOREIGN PATENT DOCUMENTS

| WO | WO-2019162433 A1 * | 8/2019 | ............. B60B 35/06 |
|---|---|---|---|
| WO | WO-2021140299 A1 * | 7/2021 | ........... B62D 63/061 |
| WO | WO-2021257798 A1 * | 12/2021 | ........... B62D 63/061 |

OTHER PUBLICATIONS

International Search Report dated Sep. 23, 2021 from corresponding International Application No. PCT/US21/37776.

*Primary Examiner* — Jacob B Meyer
(74) *Attorney, Agent, or Firm* — Duquette Law Group LLC

(57) ABSTRACT

Embodiments of the innovation relate to a vehicle trailer, comprising a base having a set of base panels, each base panel of the set of base panels hingedly connected to an adjacent base panel of the set of base panels, the base configured to be coupled to a vehicle; and a trailer positioning assembly configured to be coupled to the vehicle and coupled to at least one base panel of the set of base panels, the trailer positioning assembly configured to position the base between a first, expanded position relative to the vehicle, and a second, compacted position relative to the vehicle while the vehicle trailer is coupled to the vehicle.

20 Claims, 18 Drawing Sheets

(56) References Cited

U.S. PATENT DOCUMENTS

| | | | |
|---|---|---|---|
| 8,210,559 B2 | 7/2012 | Russell | |
| 9,725,024 B1* | 8/2017 | Davis | B62D 63/062 |
| 10,081,402 B1* | 9/2018 | Davis | B60P 1/18 |
| 2002/0195798 A1* | 12/2002 | James | B62K 27/02 |
| | | | 280/656 |
| 2005/0093273 A1* | 5/2005 | McDonell | B62D 63/061 |
| | | | 280/656 |
| 2005/0184485 A1* | 8/2005 | Timmermans | B60P 1/027 |
| | | | 280/43.1 |
| 2006/0091646 A1* | 5/2006 | Steins | B62D 63/061 |
| | | | 280/656 |
| 2007/0018429 A1* | 1/2007 | Randall | B60D 1/54 |
| | | | 280/491.1 |
| 2008/0157493 A1* | 7/2008 | McConkey | B62D 63/061 |
| | | | 280/40 |
| 2009/0007948 A1* | 1/2009 | Dempsey | B60P 3/34 |
| | | | 135/96 |
| 2009/0295192 A1* | 12/2009 | Hyde | B62D 63/061 |
| | | | 296/181.7 |
| 2009/0309330 A1* | 12/2009 | Ryan | B60D 1/46 |
| | | | 280/43.13 |
| 2010/0032918 A1* | 2/2010 | Chamoun | B62D 63/061 |
| | | | 280/30 |
| 2011/0221168 A1* | 9/2011 | Alexander | B62D 63/061 |
| | | | 280/639 |
| 2011/0266776 A1* | 11/2011 | Kapels | B60D 1/52 |
| | | | 280/656 |
| 2012/0204360 A1* | 8/2012 | Chamoun | B62D 63/061 |
| | | | 14/71.3 |
| 2012/0313346 A1* | 12/2012 | Steins | B62D 63/061 |
| | | | 280/401 |
| 2014/0312593 A1* | 10/2014 | Bank | B62D 63/061 |
| | | | 280/400 |
| 2021/0394843 A1* | 12/2021 | Taylor | B62D 63/061 |

\* cited by examiner

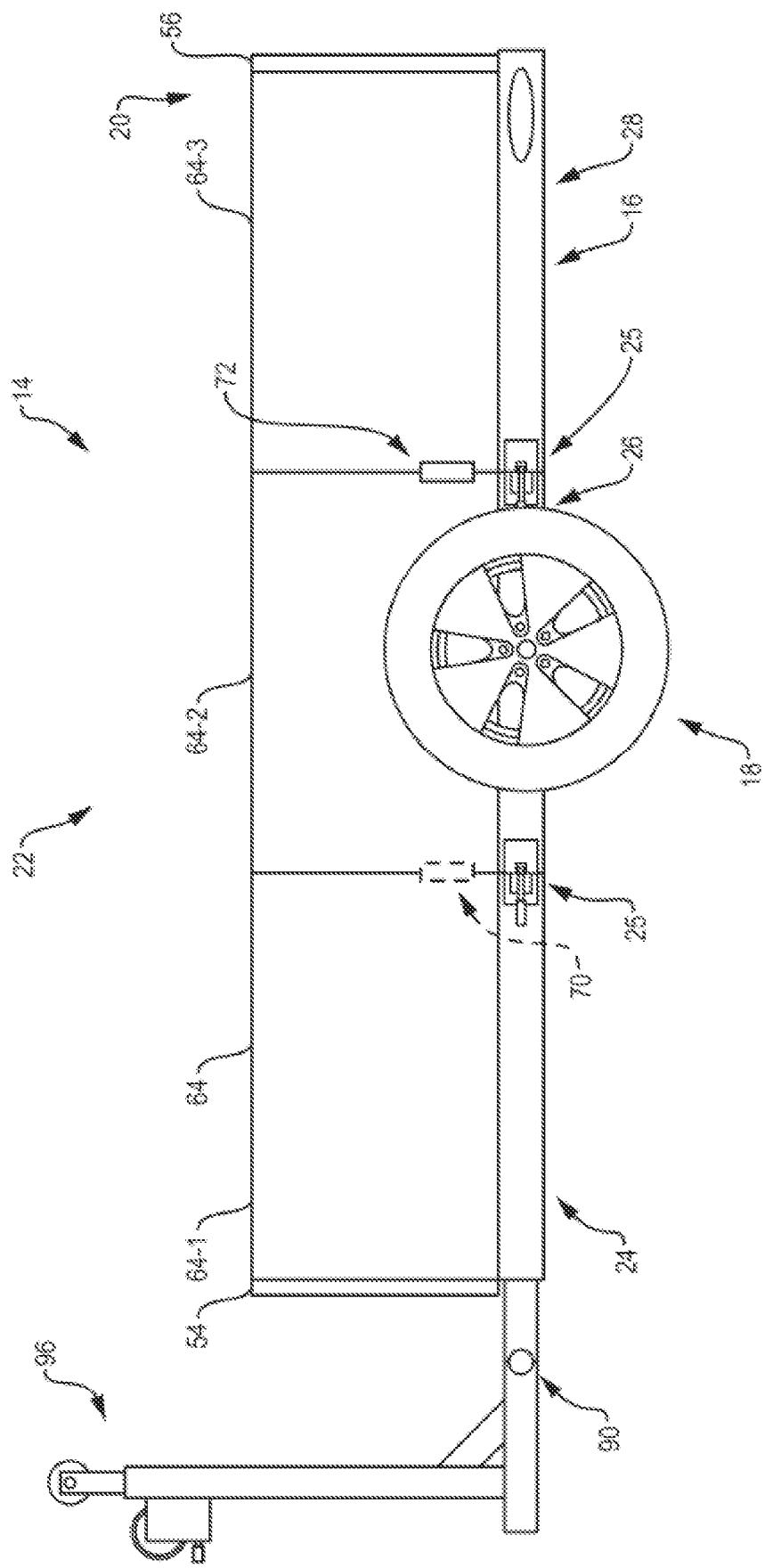

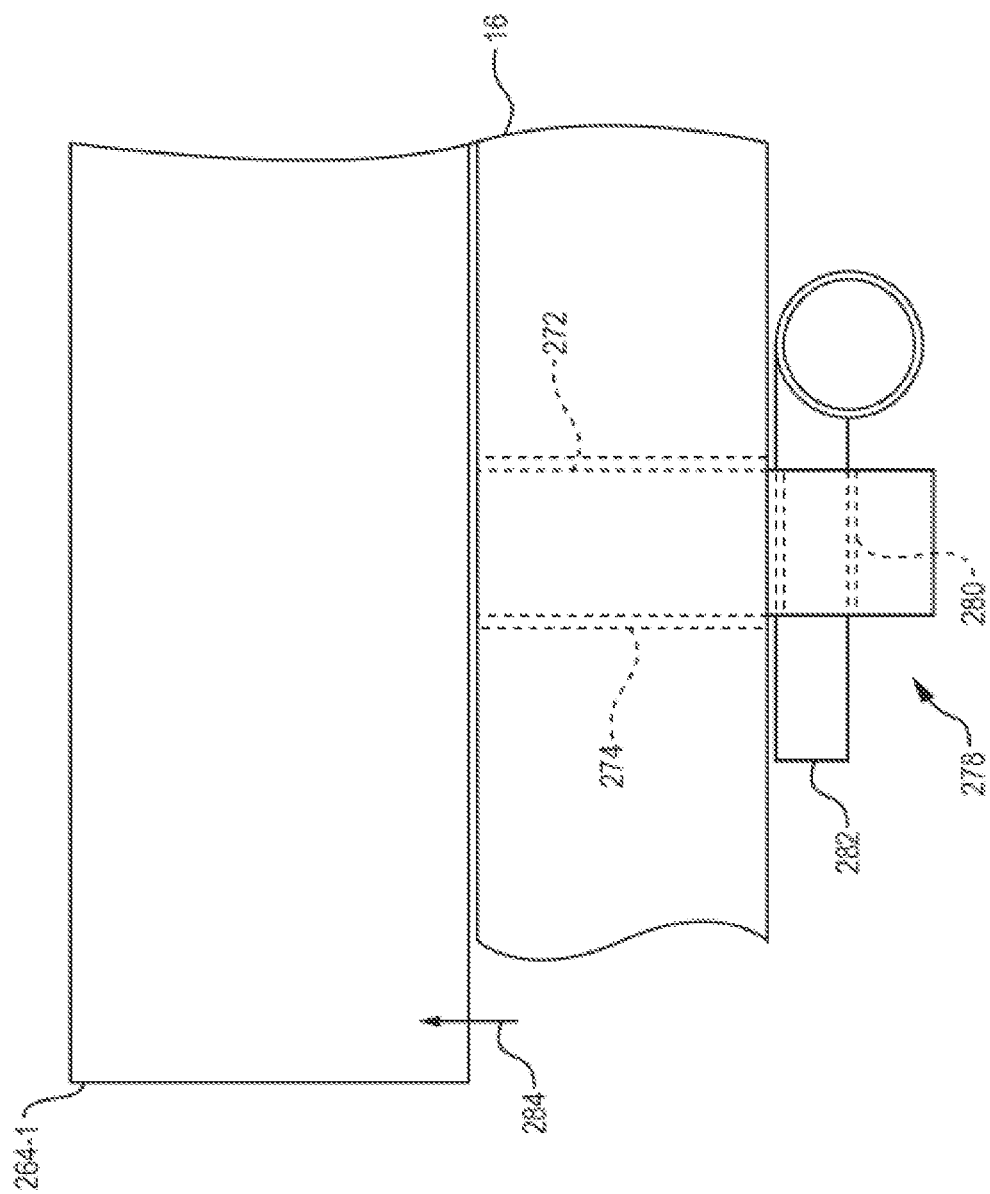

RETRACTABLE ON-BOARD VEHICLE TRAILER

RELATED APPLICATIONS

This patent application claims the benefit of U.S. Provisional Application No. 63/040,047, filed on Jun. 17, 2020, entitled, "Collapseable Vehicle Trailer," the contents and teachings of which are hereby incorporated by reference in their entirety.

BACKGROUND

Sport utility vehicles (SUVs) combine the luxury features of passenger vehicles, such as increased cargo capacity, with the features associated with off-road vehicles, such as four-wheel drive. However, even with the increase in cargo capacity relative to typical passenger vehicles, SUVs can present travelling families, such as those travelling on vacation, with a lack of space. For example, while conventional compact SUVs can provide room for 4-5 passengers, there can be little space remaining for luggage or other essential items. Further, if the compact SUV has a third row, which most do not have, passengers can be added at the cost of storage space for luggage and other items.

To increase the carrying capacity, conventional SUVs can be outfitted with add-on cargo-carrying devices. For example, a storage pod can be mounted to the roof of a conventional SUV to increase its cargo carrying capacity. In another example, a trailer can be attached to the trailer hitch of the SUV and used to carry additional cargo.

SUMMARY

The use of add-on cargo-carrying devices with an SUV can suffer from a variety of deficiencies.

For example, while a storage pod can increase the cargo-carrying capacity for the SUV, conventional storage pods are not designed to carry hard luggage, bikes, boogie boards, or other recreational items, which limits its functionality. Further, the additional weight of items contained by a storage pod can, if inadvertently over packed, change the center of mass of the SUV. Such a change can decrease the handling and performance of the SUV and can increase the risk of rollover.

In another example, while conventional trailers can also increase the cargo-carrying capacity for the SUV, these trailers can occupy a relatively large space in a parking lot or other location once the SUV has arrived at its destination. In order to minimize the disruption to others, the owner of the SUV might be required to detach the trailer from the vehicle and to place it in a separate storage space or parking spot.

By contrast to conventional add-on cargo-carrying devices, embodiments of the present innovation relate to a retractable on-board vehicle trailer. When in use, the vehicle trailer can be coupled to a vehicle trailer hitch, such as a Class III trailer hitch. The vehicle trailer can provide an approximate 4.5 ft.×8.5 ft. surface area that can carry cargo such as luggage, trail bikes, and sports gear which increases the amount of room available within the SUV for passengers. Once the vehicle has arrived at its destination, the vehicle trailer can be retracted against the vehicle vertically while remaining coupled to the vehicle hitch. With such a configuration, the vehicle can park in a single parking space without the need to detach the trailer from the vehicle.

In one arrangement, embodiments of the invention relate to a vehicle trailer, comprising a base having a set of base panels, each base panel of the set of base panels hingedly connected to an adjacent base panel of the set of base panels, the base configured to be coupled to a vehicle; and a trailer positioning assembly configured to be coupled to the vehicle and coupled to at least one base panel of the set of base panels, the trailer positioning assembly configured to position the base between a first, expanded position relative to the vehicle, and a second, compacted position relative to the vehicle while the vehicle trailer is coupled to the vehicle.

In one arrangement, embodiments of the invention relate to a transportation system, comprising a vehicle and a vehicle trailer coupled to the vehicle. The vehicle trailer comprises a base coupled to the vehicle, the base having a set of base panels, each base panel of the set of base panels hingedly connected to an adjacent base panel of the set of base panels; and a trailer positioning assembly coupled to the vehicle and coupled to at least one base panel of the set of base panels, the trailer positioning assembly configured to position the base between a first, expanded position relative to the vehicle, and a second, compacted position relative to the vehicle while the vehicle trailer is coupled to the vehicle.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

FIG. 2 illustrates a side view of the retractable vehicle trailer of FIG. 1A, according to one arrangement.

FIG. 9B illustrates a side panel locking mechanism configured to secure a side subpanel to a base of the vehicle trailer, according to one arrangement.

DETAILED DESCRIPTION

Embodiments of the present innovation relate to a retractable vehicle trailer. When in use, the vehicle trailer can be coupled to a vehicle trailer hitch, such as a Class III trailer hitch. The vehicle trailer can provide an approximate 4.5 ft.×8.5 ft. surface area that can carry cargo such as luggage, trail bikes, and sports gear which increases the amount of room available within the SUV for passengers. Once the vehicle has arrived at its destination, the vehicle trailer can be retracted against the vehicle vertically while remaining coupled to the vehicle hitch. With such a configuration, the vehicle can park in a single parking space without the need to detach the trailer from the vehicle.

Figure 1A:
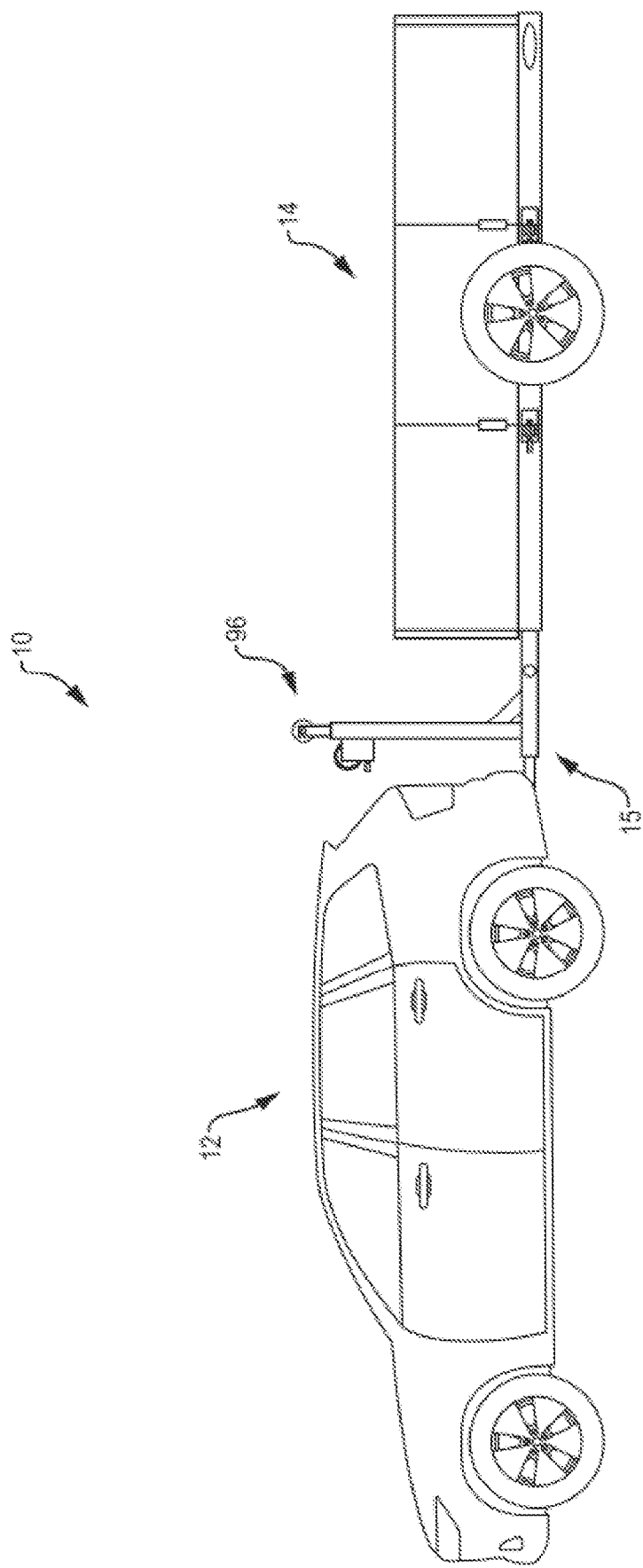
FIG. 1A illustrates a transportation system having a retractable vehicle trailer disposed in a first, expanded position, according to one arrangement.
Figure 1B:
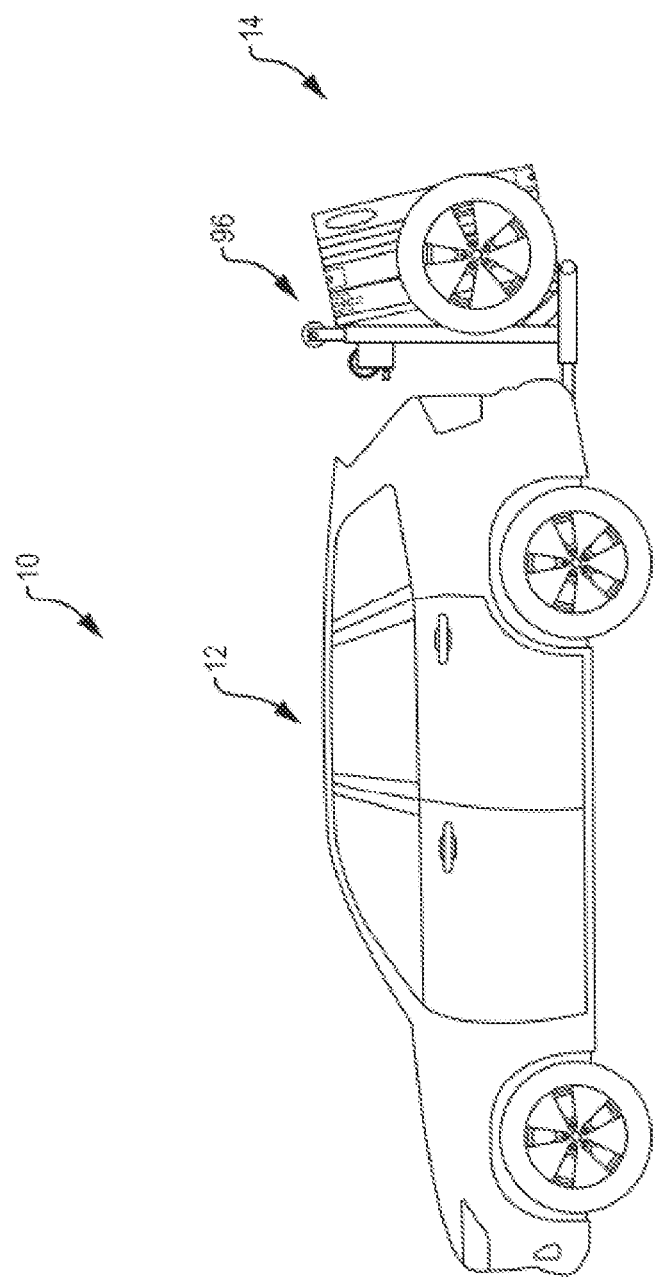
FIG. 1B illustrates the transportation system of FIG. 1A having a retractable vehicle trailer disposed in a second, compacted position against a vehicle, according to one arrangement.

FIGS. 1A and 1B illustrate a transportation system 10 which includes a vehicle 12 and a retractable on-board vehicle trailer 14 coupled to the vehicle 12 via a vehicle hitch 15. The vehicle 12 can be configured as any type of vehicle, such as a wheeled sports utility vehicle. The retractable on-board vehicle trailer 14, termed a vehicle trailer herein, is configured to provide additional cargo carrying capacity to the vehicle 12. Such additional carrying capacity can provide additional room inside the vehicle 12 for passengers.

In use, the vehicle trailer 14 can be disposed between a first, expanded position, as shown in FIG. 1A, and a second, retracted position, as shown in FIG. 1B. When retracted or folded against the vehicle 12, the vehicle trailer 14 remains coupled to the vehicle 12 and encompasses a reduced footprint, relative to the expanded state. As such, once at a destination, the vehicle operator can park the vehicle 12 in a conventional parking space without being required to detach and store the vehicle trailer 14 in a separate parking spot.

Figure 3:
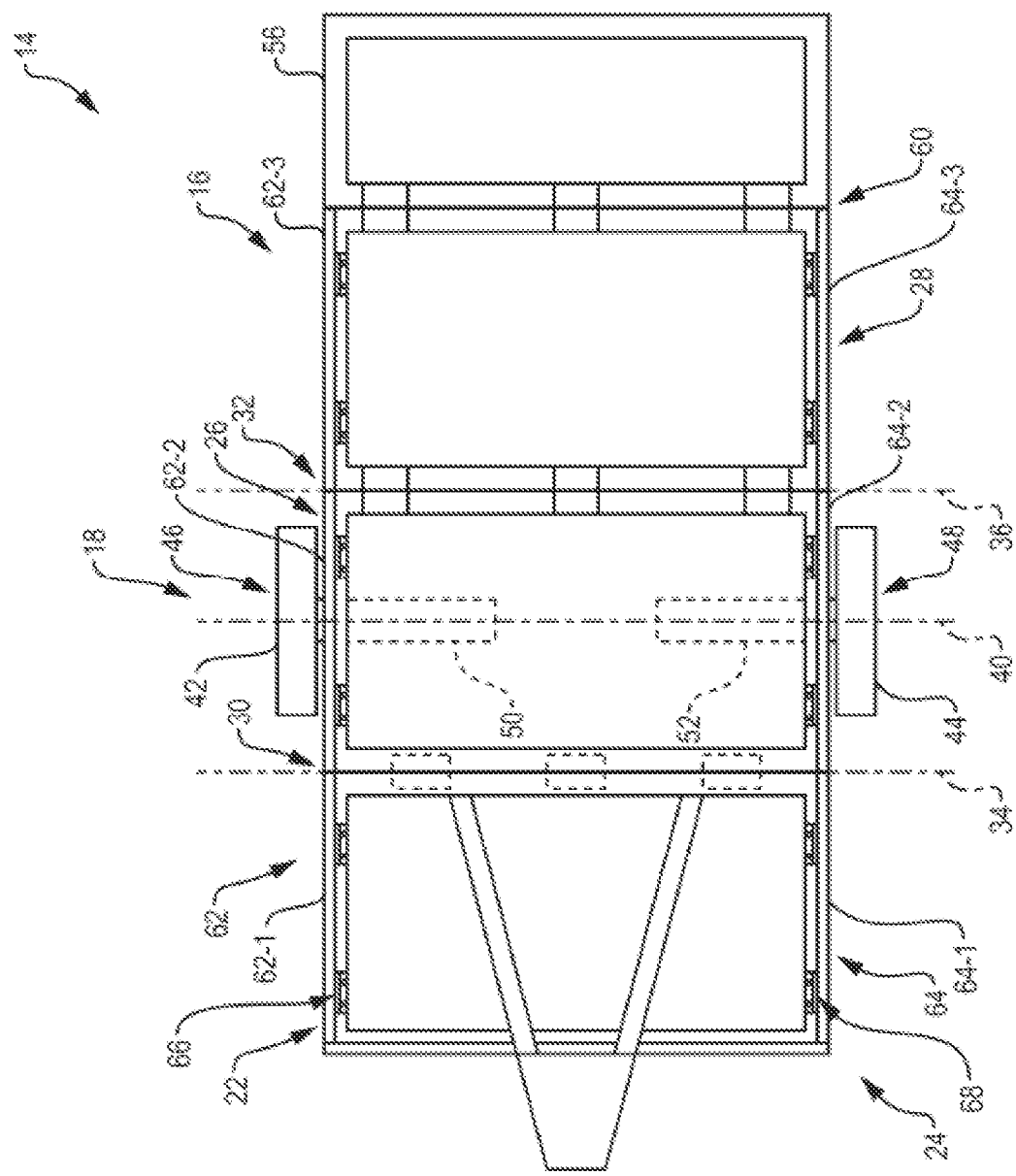
FIG. 3 illustrates a top view of the retractable vehicle trailer of FIG. 1A, according to one arrangement.

FIGS. 2 and 3 illustrate one arrangement of the vehicle trailer 14 which can include a base 16, a trailer attachment assembly 90, and a trailer positioning assembly 96.

The base 16 can include a set of base panels. For example, the base 16 can include first, second, and third base panels 24, 26, 28. These base panels 24, 26, 28 can be hingedly coupled to each other to allow the base panels 24, 26, 28 to fold onto each other when placed in a retracted position, such as shown in FIG. 1B. For example, the first and second base panels 24, 26 can be hingedly connected by a first set of hinges 30 disposed on a second or bottom surface of the vehicle trailer 14 while the second and third panels 26, 28 can be hingedly connected by a second set of hinges 32 disposed on a first or top surface of the vehicle trailer 14.

The first and second sets of hinges 30, 32 can be configured in a variety of ways. For example, the sets of hinges 30, 32 can be butt hinges. With such a configuration, based upon the positioning of the butt hinges 30 on the bottom surfaces of the vehicle trailer 14, and with reference to FIG. 3, the first and second base panels 24, 26 are configured to rotate about a longitudinal axis 34 such that, when placed in a retracted positon, the bottom surfaces of the base panels 24, 26 are disposed in opposing proximity to each other. Further, based upon the positioning of the butt hinges 32 on the top surfaces of the vehicle trailer 14, the second and third base panels 26, 28 are configured to rotate about a longitudinal axis 36 such that the top surfaces of the panels 24, 26 are disposed in opposing proximity to each other. That is, following retraction of the vehicle trailer 14, the third base panel 28 is disposed against the second base panel 26.

With continued reference to FIG. 2, each of the base panels 24, 26, 28 can be interconnected with locking elements 25 disposed between adjacent panels (i.e., between first and second panels 24, 26 and between second and third panels 26, 28). For example, each locking elements 25 can be configured as a latch-type toggle clamp having a latch element coupled to one base panel and a hook element coupled to an adjacent base panel. Interaction between the latch-type toggle clamp elements and the corresponding hook elements can secure adjacent panels together. Accordingly, the locking elements 25 are configured to maintain the vehicle trailer 14 in an expanded state, as shown in FIG. 1, during travel. Further, prior to retraction of the vehicle trailer 14 against the vehicle 12, a user can release the locking elements 25 to allow rotation of the base panels 24, 26, 28 relative to each other.

Returning to FIGS. 2 and 3, the base panels 24, 26, 28 can be manufactured from a variety of materials. In one arrangement, each base panel 24, 26, 28 can be constructed from a grate material, such as an aluminum grate. The grate material defines a number of openings which allow water or other particulate material to fall from the vehicle trailer 14, thereby minimizing the amount of debris accumulated by the vehicle trailer 14. In one arrangement, each base panel 24, 26, 28 can be constructed from a solid material, such as diamond plate.

The vehicle trailer 14 can include a set of wheels 18 that can be rotatably coupled to the base 16 at a relatively central location relative to the vehicle trailer 14. For example, the set of wheels 18 can be coupled to a central location of the second base panel 26.

The set of wheels 18 can be coupled to the base 16 in a variety of ways. In one arrangement, the set of wheels 18 can be coupled by a single axle which extends along a longitudinal axis 40 of the second base panel 26. In one arrangement, each wheel 42, 44 of the set of wheels 18 form part of a respective wheel assembly 46, 48, as indicated in FIG. 3. Each wheel assembly 46, 48 includes a respective housing 50, 52 coupled to the base 16 and with each wheel 42, 44 rotatably coupled to the corresponding housing 50, 52.

As indicated in FIG. 2, the vehicle trailer 14 can include a trailer attachment assembly 90 disposed between the trailer positioning assembly 96 and the base 16. In one arrangement, the trailer attachment assembly 90 can be configured to attach the vehicle trailer 14 to the vehicle hitch 15 associated with the vehicle 12. For example, the trailer attachment assembly 90 can have a first end 152 which is mechanically coupled to the vehicle hitch 15 and a second end 154 which is mechanically coupled to the vehicle trailer 14.

In one arrangement, the trailer attachment assembly 90 can be configured to provide rotation of the base 16 within a vertical plane relative to the trailer positioning assembly 98 (i.e., within the plane of the page). For example, the trailer attachment assembly 90 can include a rotational joint 150 disposed between the first and second components 152, 154. During operation, the second component 154 is configured to rotate about a longitudinal axis 160 of the rotational joint 150 relative to the first component 152. As such, the rotational joint 150 provides vertical rotation (e.g., up-and-down rotation) of the base 16 of the vehicle trailer 14 relative to the vehicle 12. For example, as the trailer positioning assembly 96 disposes the vehicle trailer 14 between a first position, as shown in FIG. 1A, and a second position, as shown in FIG. 1B, the rotational joint 150 allows rotation of the base 16 about longitudinal axis 160 toward the vehicle 12.

The trailer attachment assembly 90 can be configured in a variety of ways. In one arrangement, the trailer attachment assembly 90 is configured as a hitch ball and receiver assembly disposed between the vehicle 12 and vehicle trailer 14. With such a configuration, the receiver assembly is configured to rotate within the vertical plane relative to the hitch ball. In one arrangement, the trailer attachment assembly 90 is configured as a V-shaped Lock N Roll trailer hitch and a vehicle side option of the Lock N Roll trailer hitch (Lock 'N' Roll, Chicago, Ill.).

Returning to FIG. 2, and as provided above, the vehicle trailer 14 can include the trailer positioning assembly 96 which is configured to position the base 16 between a first, expanded position relative to the vehicle 12 (e.g., to carry a cargo such as luggage, trail bikes, and sports gear to a destination) and a second, compacted position against the vehicle 12 while the vehicle trailer 14 is coupled to the vehicle 12. In one arrangement, the trailer positioning assembly 96 can include a frame 190 and a trailer positioning mechanism 108 disposed on the frame 190.

Figure 4A:
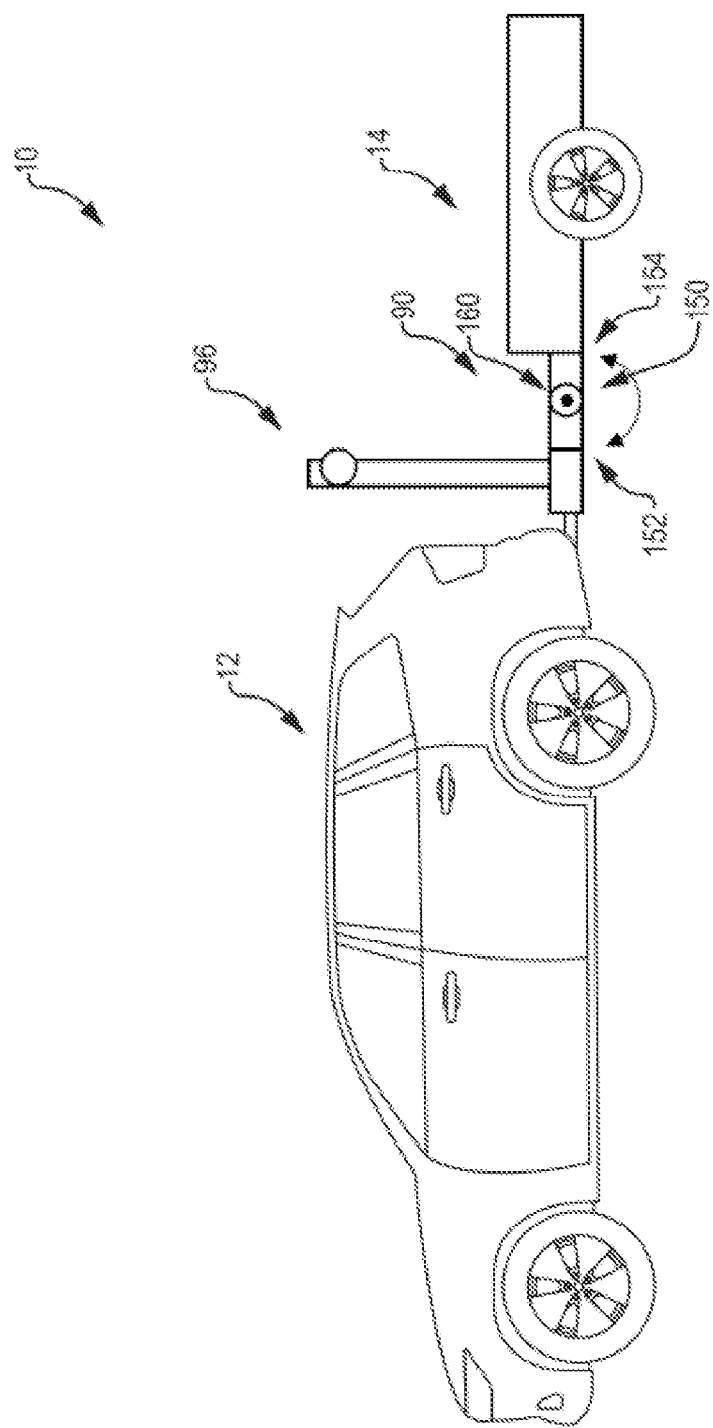
FIG. 4A illustrates the transportation system of FIG. 1 having a trailer attachment assembly, according to one arrangement.
Figure 4B:
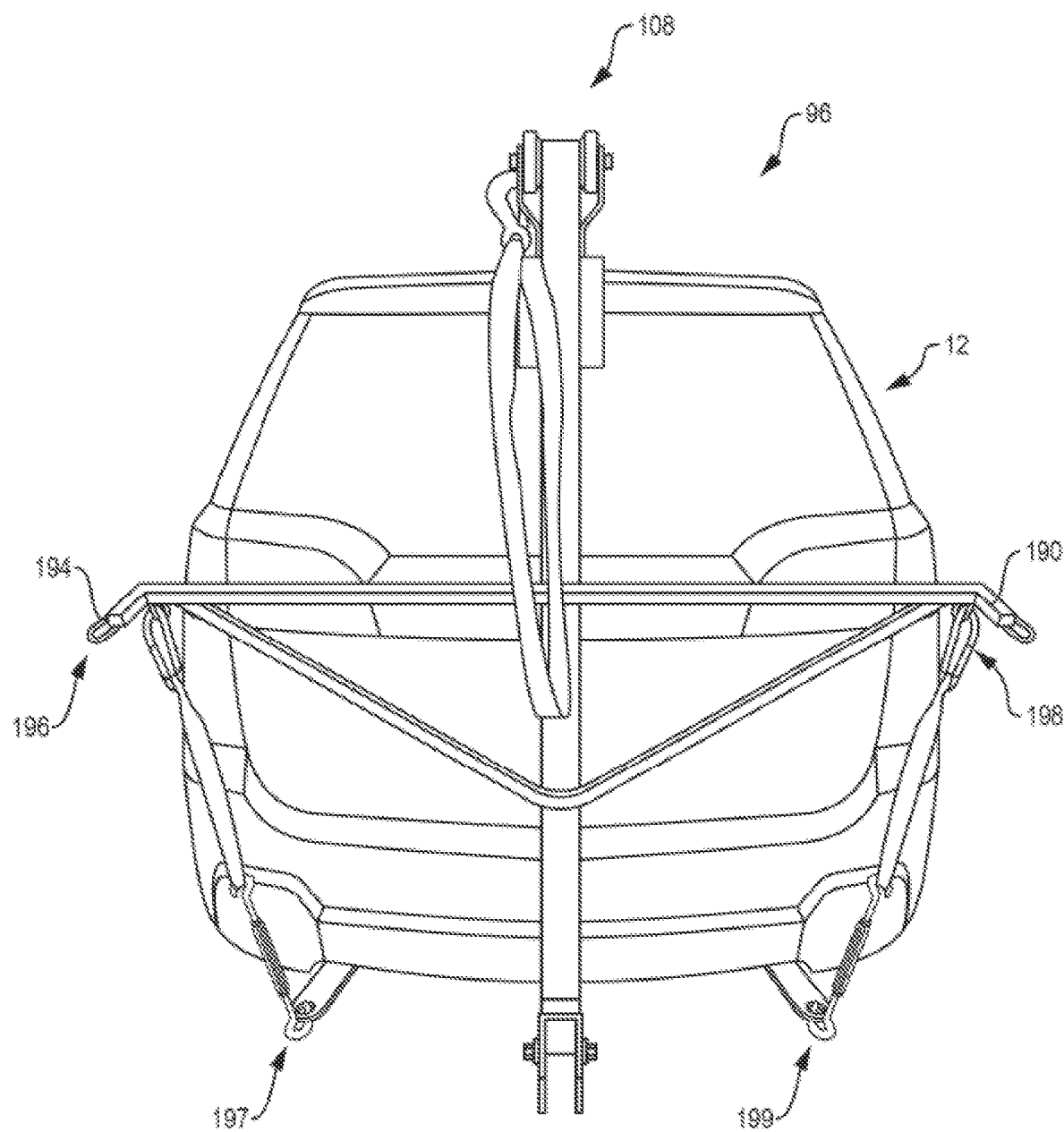
FIG. 4B Illustrates a front view of a trailer positioning assembly, according to one arrangement.
Figure 4C:
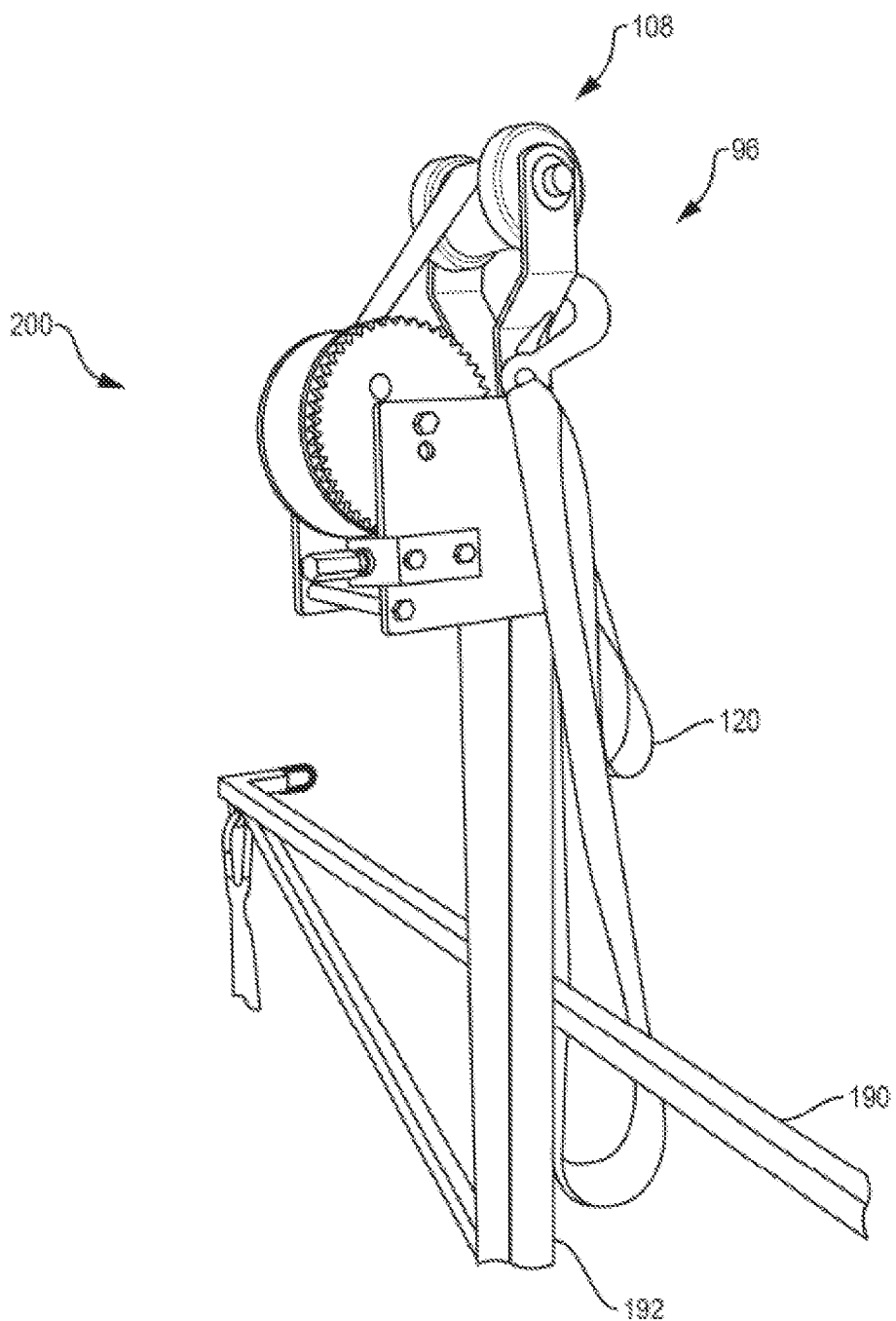
FIG. 4C illustrates perspective view of the trailer positioning assembly of FIG. 4B, according to one arrangement.

With reference to FIGS. 4B and 4C, the frame 190 is coupled to the vehicle 12 and supports the trailer positioning mechanism 108. The frame 190 can be coupled to the vehicle 12 in a variety of ways. For example, the frame 190 can include a first, vertical member 192 coupled to the vehicle hitch 15 of the vehicle 12. The frame 190 can also include a second, horizontal member 194 having a first end 194 coupled to a first rear frame element 197 of the vehicle 12 and having a second end 198 coupled to a second rear frame element 199 of the vehicle 12. The horizontal member 194 is configured to stabilize the vertical member 192 during a trailer retraction or expansion procedure.

Figure 7:
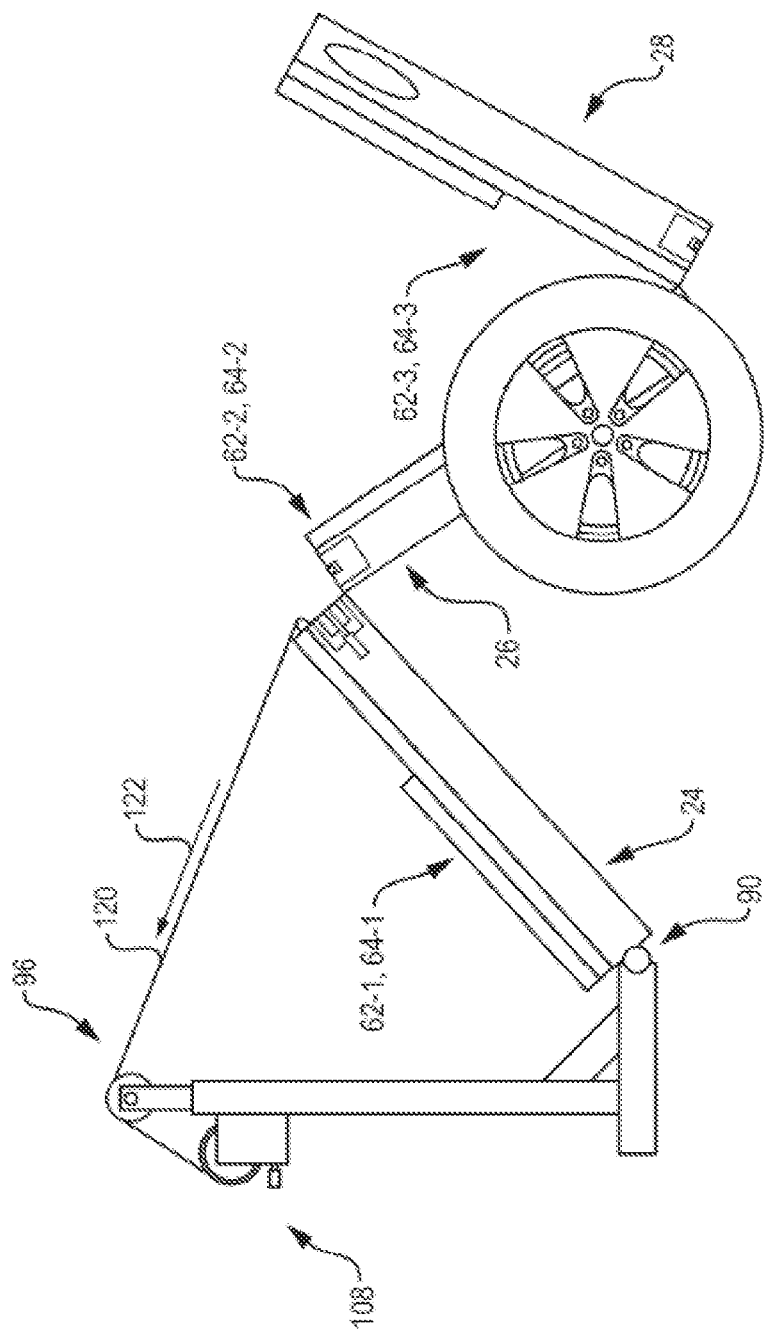
FIG. 7 illustrates a side view of the retractable vehicle trailer of FIG. 1A moving from the first, expanded position to the second

The trailer positioning mechanism 108 can be configured in a variety of ways. For example, trailer positioning mechanism 108 can be an electric or manually-operated winch having a tether 120 coupled to one or more base panels 24, 26, 28 of the vehicle trailer 14, as indicated in FIG. 7. In another example, as shown in FIGS. 4E and 4F, the trailer positioning mechanism 108 can be a worm gear 200 having the tether 120 disposed thereon.

Returning to FIGS. 2 and 3, the vehicle trailer 14 can include a first set of opposing side panels 20 extending from the base 16 and a second set of opposing side panels 22 extending from the base 16. The first and second sets of panels 20, 22 define a perimeter about the outer periphery of the base 16 and, with the base 16, define a volume configured to contain cargo. For example, the base 16 and first and second sets of panels 20, 22 can define a 4.5 ft.×8.5 ft. surface area and a 67.50 cubic foot volume configured to carry a variety of items such as luggage, trail bikes, backpacks, and sports gear. One or more of the base 16, the first set of panels 20, and the second set of panels 22 can include a securing mechanism to secure the cargo to the vehicle trailer 14. For example, the base 16, the first set of panels 20, and/or the second set of panels 22 can include D-hinges configured to hold straps or other materials. In use, a user can tie the straps about the cargo and can secure the straps to the D-hinges, thereby mitigating movement of the cargo relative to the vehicle trailer 14 during travel.

Each panel of the first and second sets of panels 20, 22 can be manufactured from a variety of materials. In one arrangement, each panel of the first and second sets of panels 20, 22 is constructed from a grate material, such as an aluminum grate. The grate material defines a number of openings which minimizes the overall weight of the vehicle trailer 14 while providing relatively high strength. In one arrangement, each panel of the first and second sets of panels 20, 22 can be constructed from a solid material, such as diamond plate.

The first set of panels 20 can include a first panel 54 disposed at a first end of the base 16 in proximity to the vehicle 12 and a second panel 56 disposed at an opposing second end of the base 16 in proximity to a rear location of the vehicle trailer 14. A longitudinal axis of each panel 54, 56 is substantially parallel to the longitudinal axis 40 of the second panel 26 of the base 16.

In one arrangement, each of the first and second panels 54, 56 can be hingedly coupled to the base 16. For example, the first panel 54 can be coupled to the base 16 by a first set of hinges (not shown) while the second panel 56 can be coupled to the base 16 by a second set of hinges 60. While the first and second sets of hinges can be configured in a variety of ways, in one arrangement the first and second sets of hinges are configured as butt hinges.

The first set of panels 20 are configured to be positioned between a first, perpendicular position relative to the base 16, as indicated in FIG. 2, and a second position folded against the base 16. For example, the first panel 54 can rotate about the first set of hinges (not shown) in a clockwise direction (i.e., toward the set of wheels 18) until the first panel 54 is disposed against the first base panel 24. Further, the second panel 56 can rotate about the second set of hinges 60 in a counterclockwise direction (i.e., toward the set of wheels 18) until the second panel 56 is disposed against the third base panel 28.

With continued reference to FIGS. 2 and 3, the second set of panels 22 can include a first set of subpanels 62 disposed along a first side of the base 16 (e.g., in proximity to the first wheel assembly 46) and a second set of subpanels 64 disposed along a second side of the base 16 (e.g., in proximity to the first wheel assembly 48). A longitudinal axis of each set of subpanels 62, 64 is substantially perpendicular to the longitudinal axis 40 of the second panel 26 of the base 16.

Each subpanel of the first and second sets of subpanels 62, 64 can be hingedly coupled to the base 16. For example, with reference to FIG. 3, the first set of subpanels 62 can be coupled to the base 16 by a first set of hinges 66 while the second set of subpanels 64 can be coupled to the base 16 by a second set of hinges 68. While the first and second sets of hinges 66, 68 can be configured in a variety of ways, in one arrangement the first and second sets of hinges 66, 68 are configured as butt hinges.

Each of the first and second set of subpanels 62, 64 can include a number of subpanels which correspond to the number of base panels associated with the base 16. For example, in the present arrangement, the base 16 includes first, second, and third base panels 24, 26, 28. As such, the first set of subpanels 62 includes first, second, and third subpanels 62-1, 62-2, 62-3 and the second set of subpanels 64 includes first, second, and third subpanels 64-1, 64-2, 64-3.

In one arrangement, for each of the first and second sets of subpanels 62, 64, adjacent subpanels can be hingedly connected. For example, taking the second set of subpanels 64 as an example, with reference to FIG. 2, the first and second subpanels 64-1, 64-2 can be hingedly connected by a hinge 70 disposed on an inner surface of the second panel 64 while the second and third subpanels 64-2, 64-3 can be hingedly connected by a hinge 72 disposed on an outer surface of the second panel 64. While the hinges 70, 72 can be configured in a variety of ways, in one arrangement, the hinges 70, 72 are butt hinges.

The second set of panels 22 are configured to be positioned between a first, perpendicular position relative to the base 16, as indicated in FIG. 2, and a second position folded against the base 16. For example, the first set of subpanels 62 can rotate about the first set of hinges 66 in a direction away from the first wheel 42 until the first, second, and third subpanels 62-1, 62-2, 62-3 of the first set of subpanels 62 are disposed against the first, second, and third base panels 24, 26, 28 of the base 16. Further, the second set of subpanels 64 can rotate about the second set of hinges 66 in a direction away from the second wheel 44 until the first, second, and third subpanels 64-1, 64-2, 64-3 of the second set of subpanels 64 are disposed against the first, second, and third base panels 24, 26, 28 of the base 16.

As provided above, once the vehicle 12 has arrived at its destination, the vehicle trailer 14 can be retracted and folded against the vehicle 12 while remaining coupled to the vehicle. FIGS. 5-8 illustrate the process of positioning the trailer between the first, expanded position shown in FIG. 1A and the second, compacted or retracted position shown in FIG. 1B.

Figure 5:
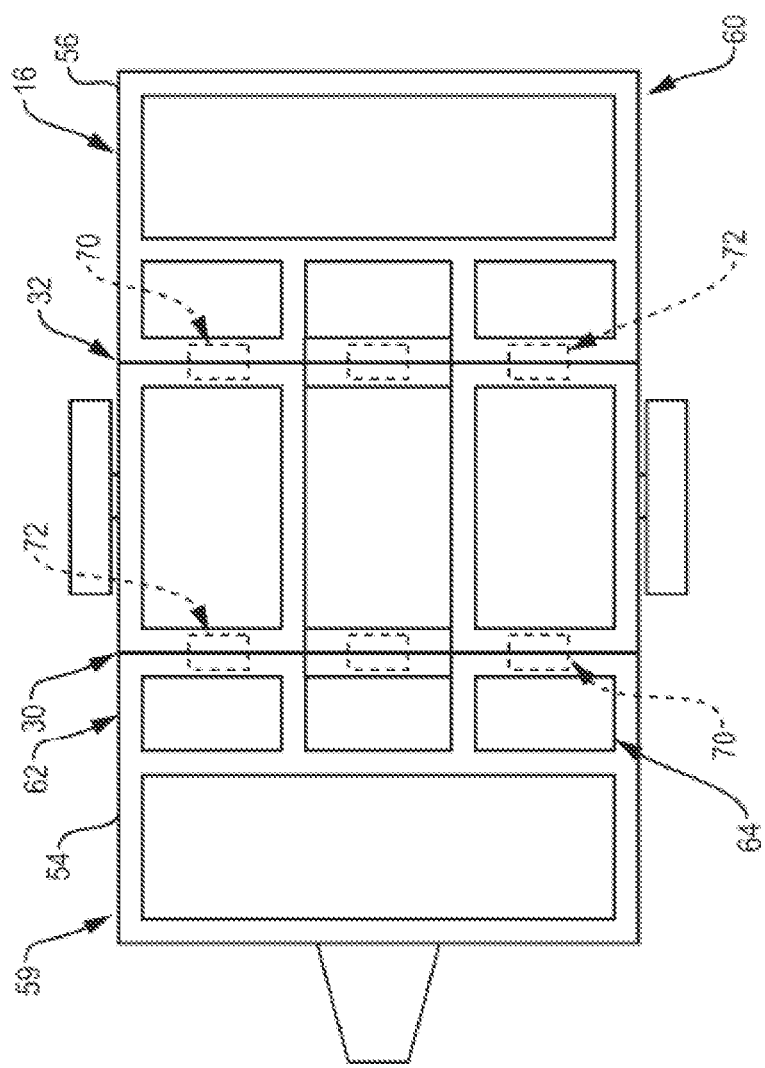
FIG. 5 illustrates a top view of the retractable vehicle trailer of FIG. 1A having first and second sets of side panels folded against a base of the trailer, according to one arrangement.
Figure 6:
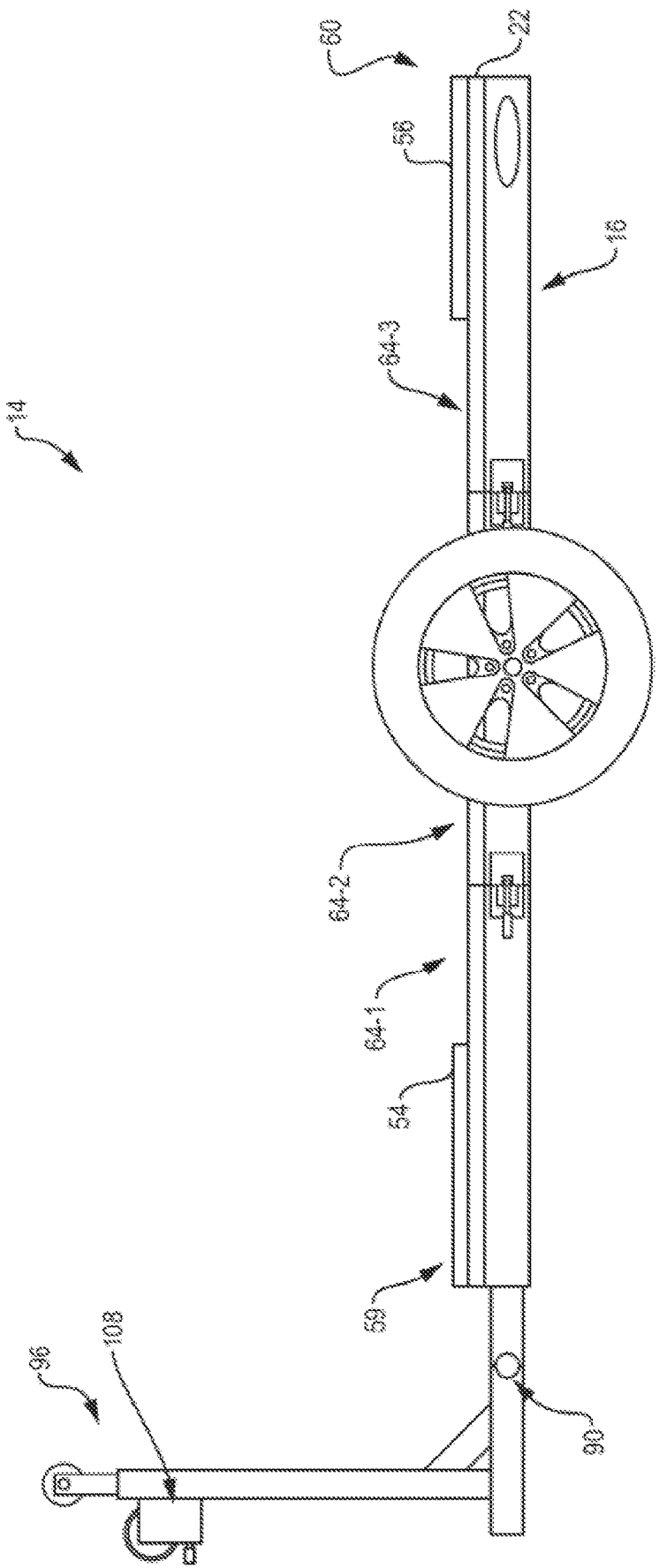
FIG. 6 illustrates a side view of the retractable vehicle trailer of FIG. 5 having the first and second sets of side panels folded against the base of the trailer, according to one arrangement.

As indicated in FIGS. 5 and 6, a user first folds the second set of panels 22 against the base 16. For example, the user rotates the first set of subpanels 62 about the first set of hinges 66 to dispose the set of subpanels 62 against the base 16. Further, the user rotates the second set of subpanels 64 about the second set of hinges 68 to dispose the set of subpanels 64 against the base 16. With such positioning, the user disposes the hinges 70 of the first and second sets of subpanels 62, 64 in alignment with the first set of hinges 30 of the first and second base panels 24, 26 and disposes the hinges 72 of the first and second sets of subpanels 62, 64 in alignment with the second set of hinges 32 of the first and second base panels 24, 26.

Next, the user folds the first set of panels 20 against the base 16. For example, user rotates the first panel 54 about a first set of hinges 59 to dispose the first panel 54 against the first subpanels 62-1, 64-1 of the second set of panels 22 and rotates the second panel 56 about a second set of hinges 60 to dispose the second panel 56 against the third subpanels 62-3, 64-3 of the second set of panels 22.

Figure 8:
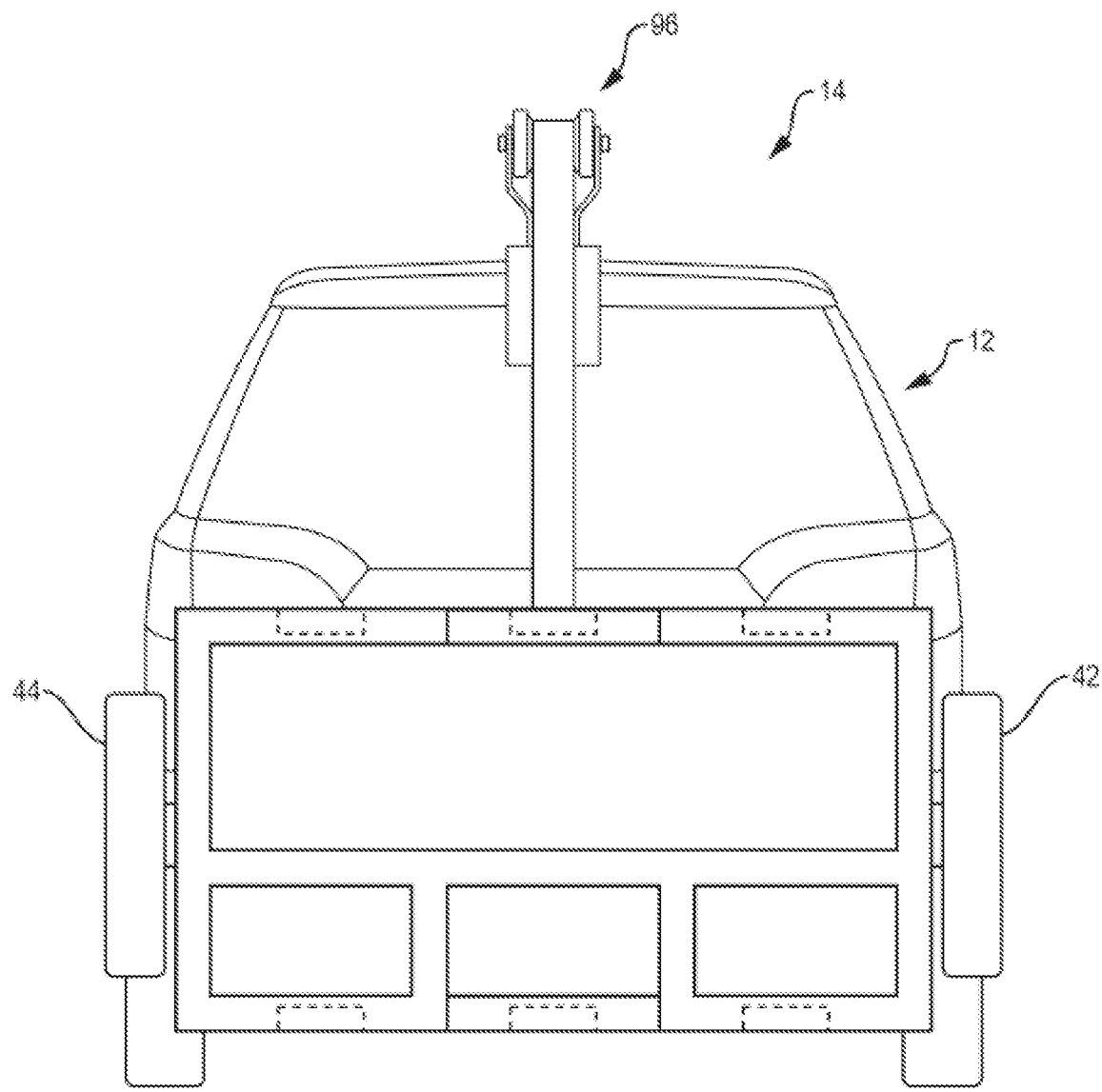
FIG. 8 illustrates a rear view of the retractable vehicle trailer of FIG. 1B, according to one arrangement.

With reference to FIG. 7, with the first and second sets of side panels 20, 22 flattened against the base 16, the user activates trailer positioning mechanism 108 to retract the vehicle trailer 14 against the vehicle 12. For example, activation of the trailer positioning mechanism 108 causes the tether 120 to travel along direction 122 and to cause the first panel 24, the first subpanels 62-1, 64-1, and the trailer-side hitch mechanism 92 to rotate toward, and relative to, the trailer positioning assembly 96 about the trailer attachment assembly 90. Rotation of the first panel 24 and the first subpanels 62-1, 64-1 causes the second panel 26 and the second subpanels 62-2, 64-2 to rotate about hinges 30, 70, respectively, toward the first panel 24. Further, rotation of the second panel 24 and the second subpanels 62-2, 64-2 causes the third panel 28 and the third subpanels 62-3, 64-3 to rotate about hinges 32, 72, respectively, toward the second panel 26. The trailer positioning mechanism 108 can draw on the tether 120 along direction 122 until the vehicle trailer 14 is retracted against the vehicle 12 in a compact position, as shown in FIGS. 1B and 8.

When folded, the vehicle trailer 14 remains coupled to the vehicle 12 via the trailer attachment mechanism 90. Further, collapsing the vehicle trailer 14 against the vehicle 12 reduces its footprint, thereby allowing the vehicle 12 to be easily parked in a standard parking space.

As provided above, the first and second sets of side panels 20, 22 are described as being hingedly coupled to the base 16 and positionable between a first, perpendicular and a second folded position relative to the base 16. Such description is by way of example only. In one arrangement, the first and second sets of panels 20, 22 can be removeably coupled to the base 16.

Figure 9A:
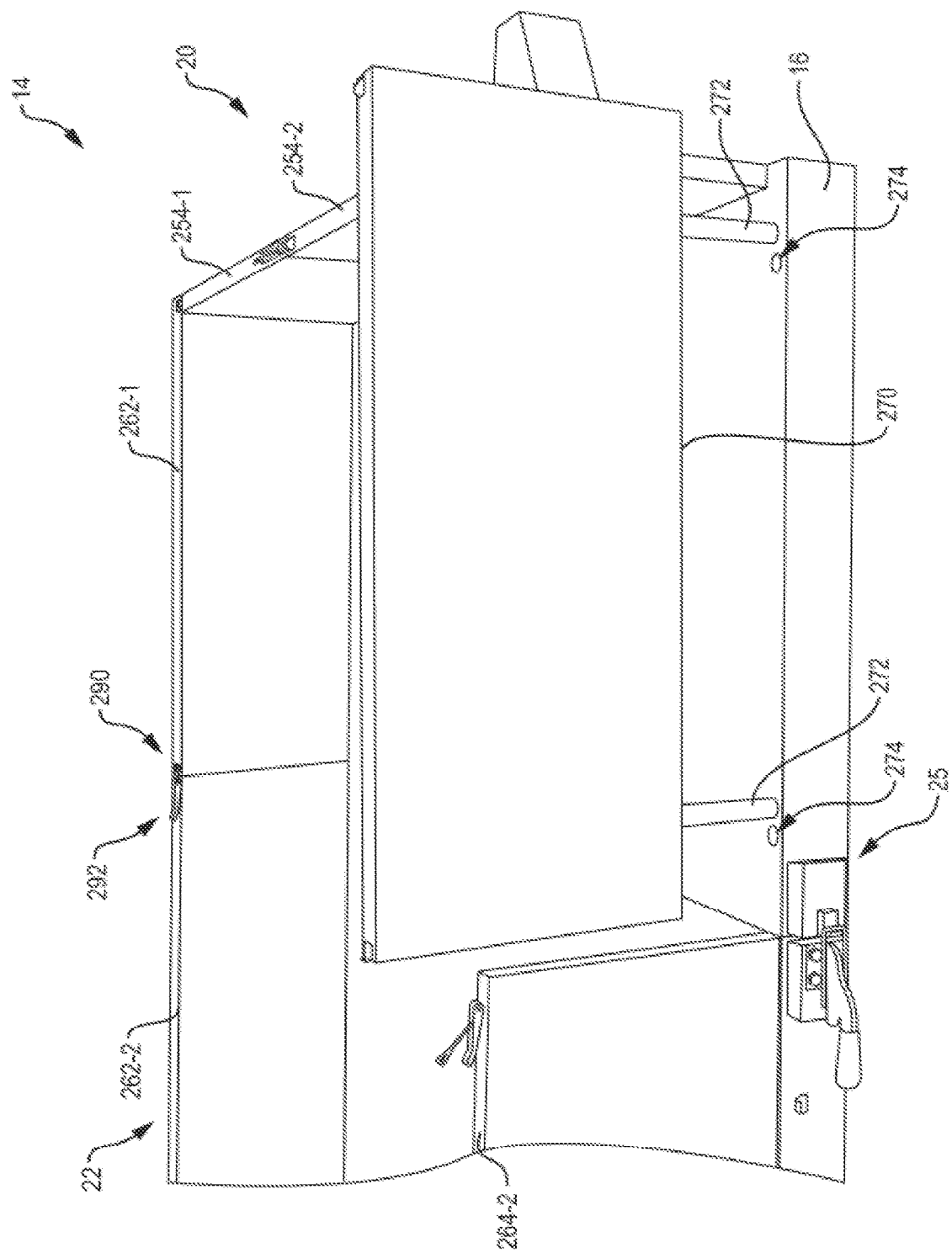
FIG. 9A illustrates a retractable vehicle trailer of FIG. 1A having removeably coupled side panels, according to one arrangement.

FIG. 9A illustrates a vehicle trailer 14 having a first set of side panels 20 where each of the first side subpanels 254-1, 254-2 and second side subpanels (not shown) are removeably coupled to the base 16. Further, the vehicle trailer 14 includes a second set of side panels 22 removeably coupled to the base 16. As indicated, the second set of side panels 22 include a first set of subpanels 262 including a first 262-1, second 262-2, and third (not shown) subpanel disposed along a first side of the base 16 and a second set of subpanels 264 including a first 264-1, second 264-2, and third (not shown) subpanel disposed along a second side of the base 16. Each subpanel includes a panel wall 270 and legs 272 extending from the panel wall 270 and configured to be inserted within, and removed from, corresponding openings 274 defined by the base 16. Further, each subpanel includes a side panel locking mechanism 278 configured to secure the subpanel to the base 16 when the vehicle trailer 16 is in use.

For example, with reference to FIG. 9B and taking subpanel 264-1 as an example, each of the legs 272 of the subpanel 264-1 can be inserted within the corresponding opening 274 provided in the base 16. Each leg 272 can further define an opening 280 having a longitudinal axis which is substantially transverse to a longitudinal axis of the base opening 274. To secure the subpanel 264-1 to the base 16, a user can insert locking members 282, such as pins, within corresponding openings 282, thereby mitigating motion of the subpanel 264-1 along direction 284. To remove the subpanel 264-1 from the base 16, the user can remove the locking members 282 from the corresponding openings 282 and can lift the subpanel 264-1 away from the base 16 along direction 284.

In one arrangement, and with reference to FIG. 9A, the first and second sets of side panels 20, 22 can include a panel interlocking system 290 configured to secure the subpanels together. For example, the panel interlocking system 290 can include a set of panel interlocking mechanisms 292 disposed between adjacent subpanels of the vehicle trailer 14.

Figure 10:
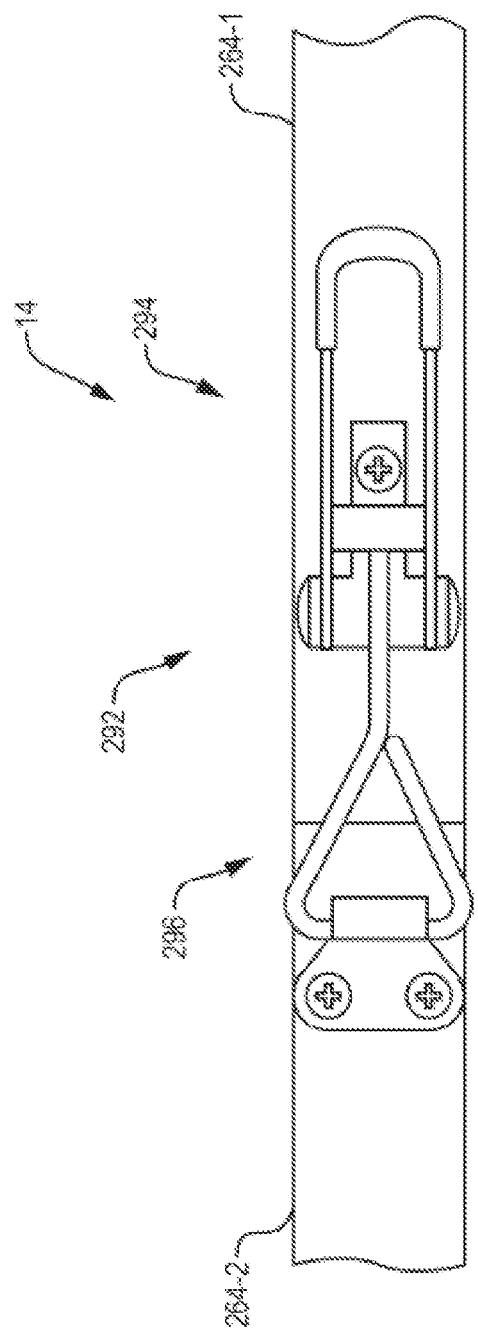
FIG. 10 illustrates a panel interlocking mechanism disposed between adjacent side panels, according to one arrangement.

With reference to FIG. 10, each panel interlocking mechanism 292, can be configured as a latch-type toggle clamp having a latch element 294 coupled to a first subpanel, such as subpanel 264-1 and a hook element 296 coupled to an adjacent second subpanel, such as subpanel 264-2. Interaction between the latch-type toggle clamp element 294 and the corresponding hook element 296 secures adjacent subpanels together. Accordingly, the panel interlocking system 290 are configured to maintain the subpanels of the vehicle trailer 14 in a connected state during travel.

With the subpanels secured to the base 16 and to each other, a user can drive the vehicle trailer 14, along with its contents, to a destination. Once the vehicle 12 has arrived at the destination, the user can retract the vehicle trailer 14 against the vehicle 12 while it remains coupled to the vehicle.

Figure 11:
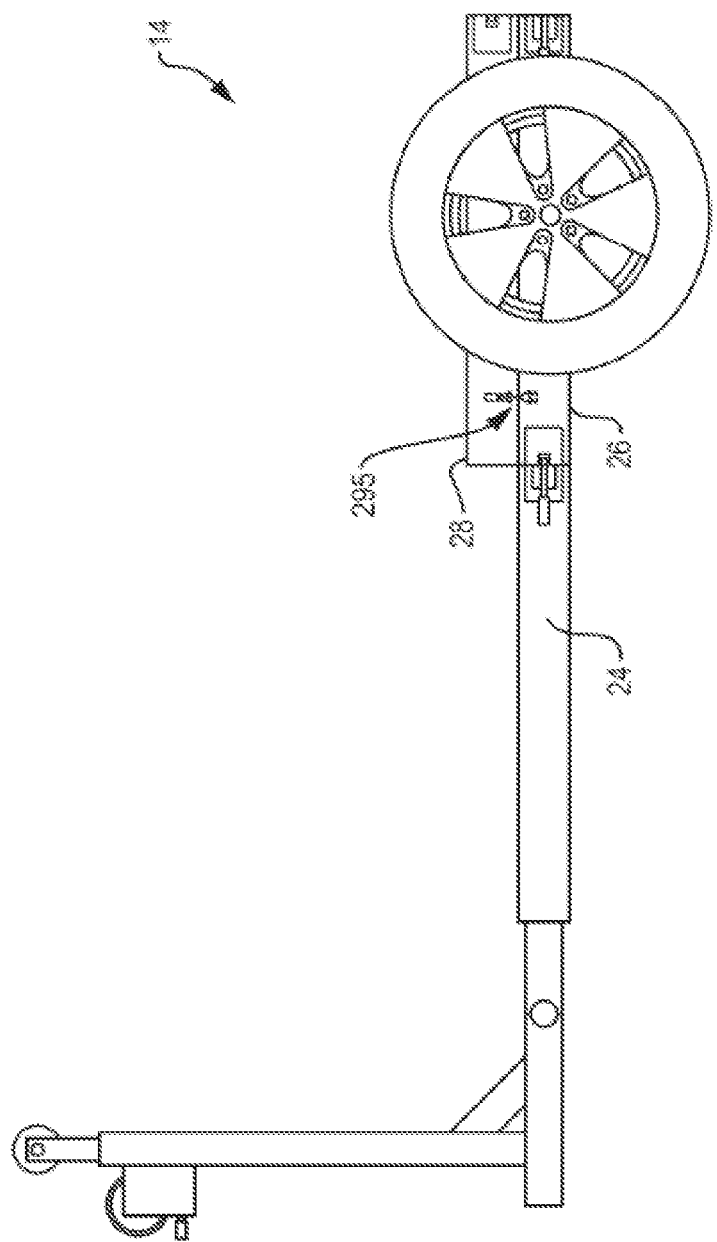
FIG. 11 illustrates the retractable vehicle trailer of FIG. 9A having the side panels removed from the base, according to one arrangement
Figure 12:
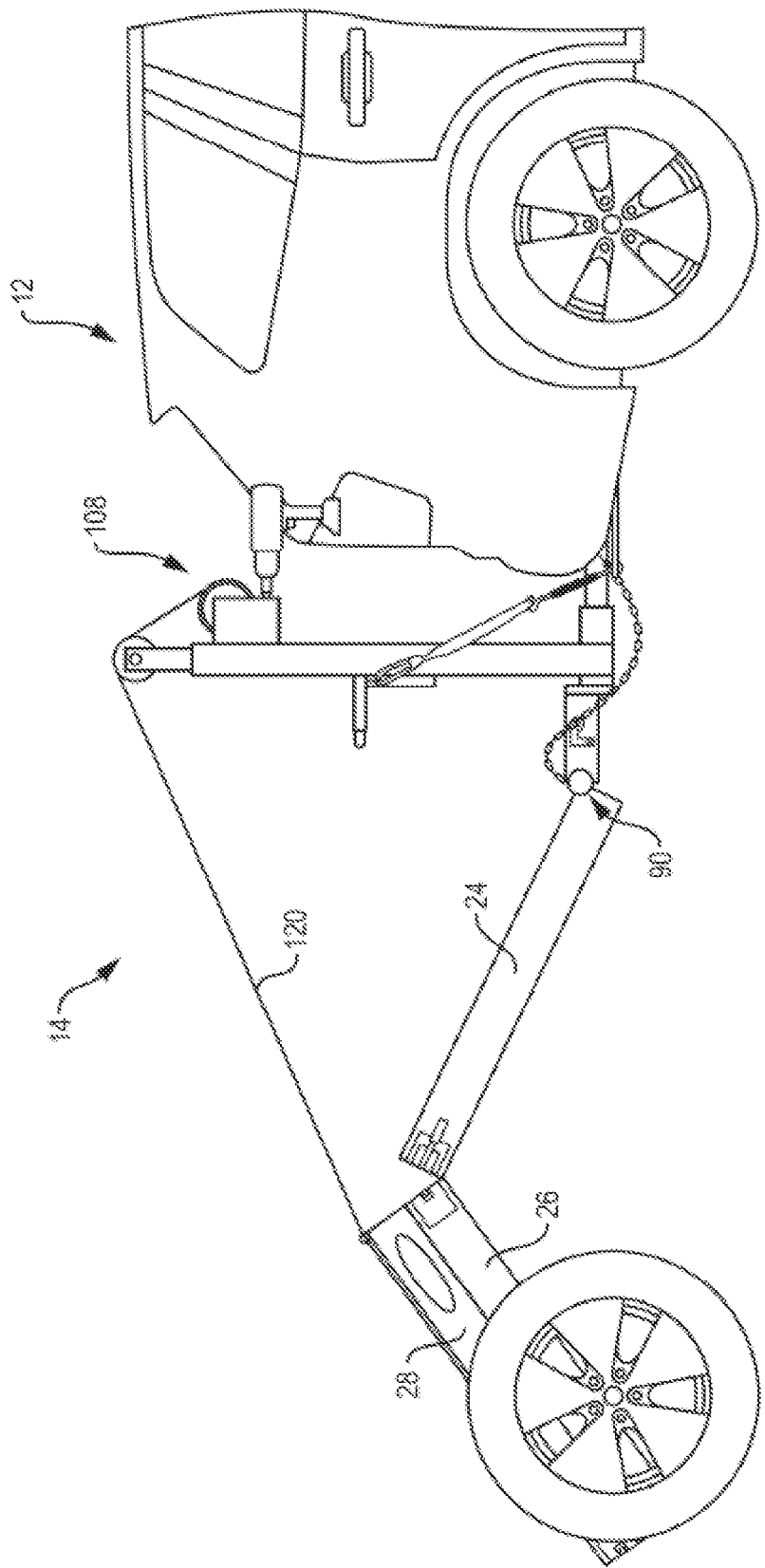
FIG. 12 illustrates the trailer positioning assembly positioning the retractable vehicle trailer of FIG. 9A towards a retracted state, according to one arrangement.
Figure 13:
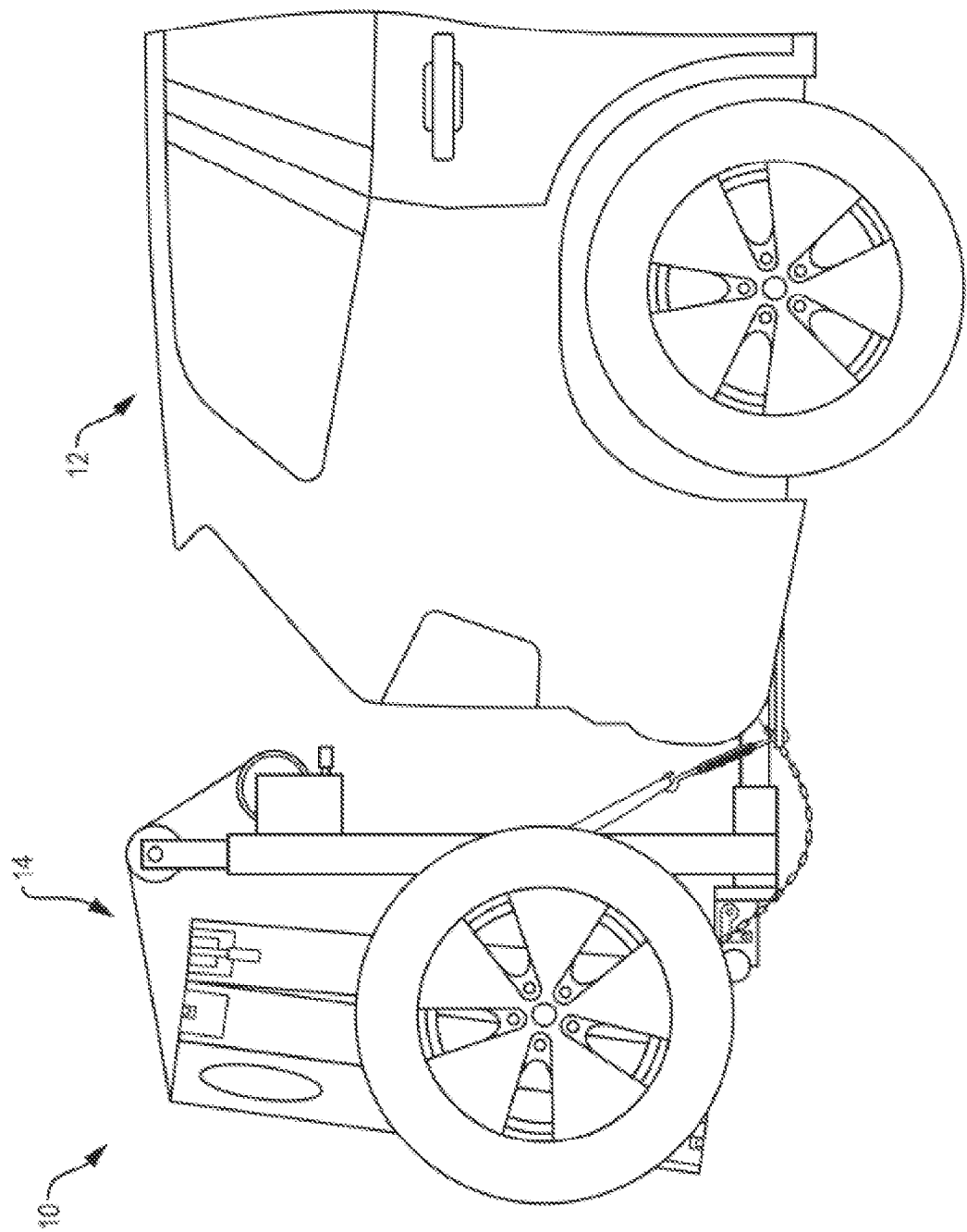
FIG. 13 illustrates the retractable vehicle trailer of FIG. 9A disposed in a retracted state against the vehicle, according to one arrangement.

First, the user first removes the first and second sets of side panels 20, 22 from the base 16. For example, the user can release the panel interlocking mechanisms 292 from adjacent subpanels and can remove locking members 282 of the side panel locking mechanisms 278 from the legs 272 of the subpanels. With the panel interlocking mechanisms 292 and the side panel locking mechanisms 278 disengaged, the user can remove each subpanel from the base 16. Next, with reference to FIG. 11, the user can disengage the locking elements 25 disposed between adjacent panels, can fold the third base panel 28 against the second base panel 26 and can secure the panels 26, 28 together using a securing mechanism 295. Next, as indicated in FIG. 12, the user can connect the tether 120 of the trailer positioning mechanism 108 to the third base panel 28 and can activate the trailer positioning mechanism 108 to tension the tether 120 and to retract the vehicle trailer 14 against the vehicle 12 to a vertical position, as shown in FIG. 13.

Figure 14:
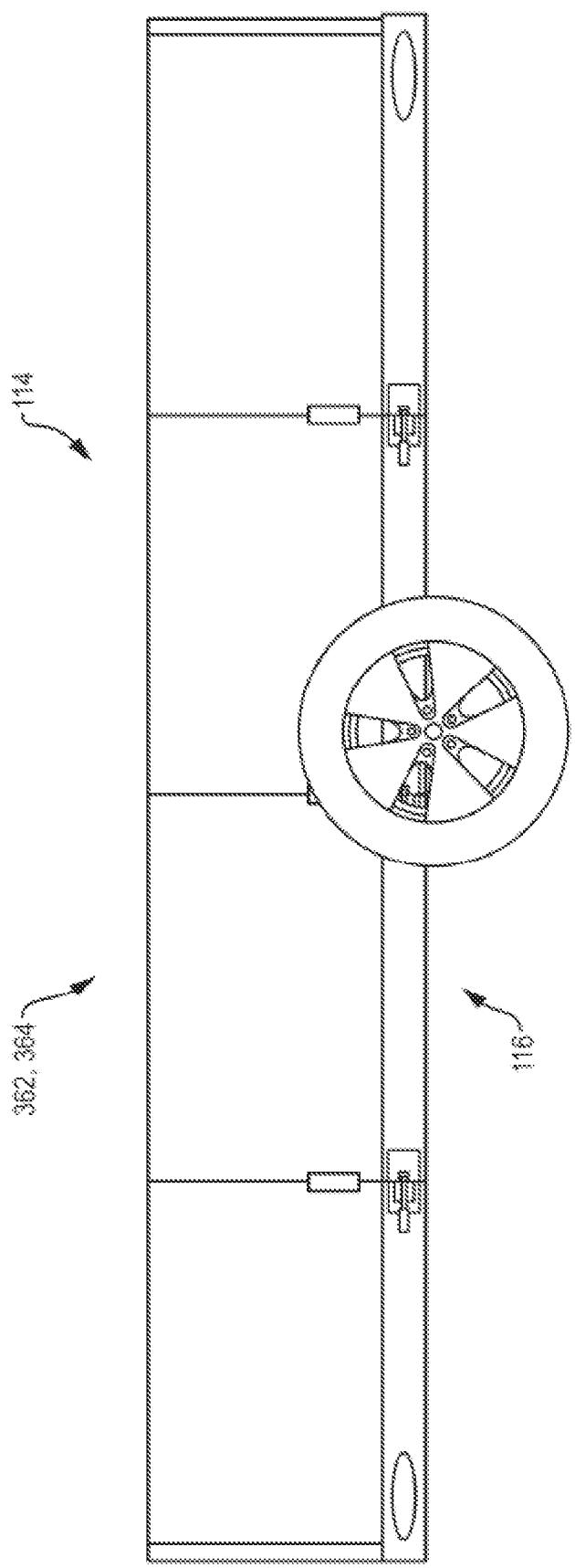
FIG. 14 illustrates a side view of a retractable vehicle trailer, according to one arrangement.

As described above, the vehicle trailer 14 includes a base 16 having three panels 24, 26, 28 and the first and second sets of subpanels 62, 64 each having three subpanels 62-1, 62-2, 62-3 and 64-1, 62-2, 62-3, respectively. Such description is by way of example only. In one arrangement, the base 16 and the first and second sets of subpanels 62, 64 can include any number of panels. For example, as shown in FIG. 14, vehicle trailer 114 includes a base 116 having four base panels and side panels 362, 364, each of which each include four subpanels.

In one arrangement, the vehicle trailer 14 can be configured to carry, as cargo, a wheeled vehicle, such as a motorcycle. In such an arrangement, the vehicle trailer 14 can include a ramp to allow the vehicle to be wheeled into the vehicle trailer 14. For example, the second panel 56 disposed at the rear location of the vehicle trailer 14 can be configured to rotate away from the third base panel 28, as illustrated in FIG. 3 to form the ramp for the vehicle. In another example, the second panel 56 can be removed from the third base panel 28 and replaced with an extended ramp panel to allow the vehicle to be wheeled into the vehicle trailer 14. In another example, the second panel 56 can rotate against the third base panel 28, as described above, and the third base panel 28 is configured to allow connection of an extended ramp panel.

While various embodiments of the innovation have been particularly shown and described, it will be understood by those skilled in the art that various changes in form and details may be made therein without departing from the spirit and scope of the innovation as defined by the appended claims.

What is claimed is:

1. A vehicle trailer, comprising:
   a base having a set of base panels, each base panel of the set of base panels hingedly connected to an adjacent base panel of the set of base panels, the base configured to be coupled to a vehicle;
   a trailer positioning assembly configured to be coupled to the vehicle, the trailer positioning assembly comprising:
      a vertical frame having a first end configured to be coupled to the vehicle and an opposing second end, and
      a trailer positioning mechanism disposed at the second end of the vertical frame, the trailer positioning mechanism comprising a tether coupled to at least one of a first base panel and a second base panel of the set of base panels in proximity to a hinged connection disposed between the first base panel and the second base panel; and
   a trailer attachment assembly disposed between the first panel of the base and the trailer positioning assembly, the trailer attachment assembly comprising a rotational joint having a first portion configured to be coupled to the vehicle and a second portion coupled to the first base panel of the set of base panels, the trailer attachment assembly configured to provide rotation of the first base panel about the rotational joint and within a vertical plane relative to the trailer positioning assembly,
   the trailer positioning assembly configured to position the base between a first, expanded position relative to the vehicle, and a second, retracted position relative to the vehicle such that a bottom surface of the first panel of the set of base panels is disposed in opposing proximity to a bottom surface of an adjacent second panel of the set of base panels while the vehicle trailer is coupled to the vehicle.

2. The vehicle trailer of claim 1, further comprising a set of wheels rotatably coupled to the base.

3. The vehicle trailer of claim 1, wherein the base further comprises a set of locking elements, each locking element of the set of locking elements disposed between adjacent panels of the set of panels.

4. The vehicle trailer of claim 1, further comprising a first set of side panels hingedly coupled to the base, the first set of side panels comprising a first side panel disposed at a first end of the base and a second side panel disposed at an opposing second end of the base.

5. The vehicle trailer of claim 4, further comprising a second set of side panels hingedly coupled to the base, the second set of side panels comprising a first set of subpanels disposed along a first side of the base and a second set of subpanels disposed along a second side of the base, each panel of the first set of subpanels hingedly coupled to an adjacent subpanel of the first set of subpanels, and each panel of the second set of subpanels hingedly coupled to an adjacent subpanel of the second set of subpanels.

6. The vehicle trailer of claim 5, wherein:
   the first set of subpanels comprises a number of subpanels which correspond to a number of base panels associated with the base; and
   the second set of subpanels comprises a number of subpanels which correspond to the number of base panels associated with the base.

7. The vehicle trailer of claim 1, further comprising a first set of side panels removeably coupled to the base, the first set of side panels comprising a first side panel disposed at a first end of the base and a second side panel disposed at an opposing second end of the base.

8. The vehicle trailer of claim 7, wherein:
   the first side panel comprises a first side panel locking mechanism configured to secure the first side panel to the first end of the base; and the second side panel comprises a second side panel locking mechanism configured to secure the second side panel to the second end of the base.

9. The vehicle trailer of claim 7, further comprising a second set of side panels removeably coupled to the base, the second set of side panels comprising a first set of subpanels disposed along a first side of the base and a second set of subpanels disposed along a second side of the base.

10. The vehicle trailer of claim 9, wherein:
each subpanel of the first set of subpanels comprises a first subpanel locking mechanism configured to secure the subpanel to the first side of the base; and
each subpanel of the second set of subpanels comprises a second subpanel locking mechanism configured to secure the subpanel to the second side of the base.

11. The vehicle trailer of claim 9, further comprising a panel interlocking system having a set of panel interlocking mechanisms, each panel interlocking mechanism configured to secure at least one of adjacent subpanels of the first set of subpanels, adjacent subpanels of the second set of subpanels, subpanels of the first and second set subpanels to the adjacent first side panel, and subpanels of the first and second set subpanels to the adjacent second side panel.

12. The vehicle trailer of claim 1, wherein the trailer positioning mechanism comprises a winch coupled to the second end of the vertical frame, the winch disposed in operational communication with the tether.

13. A transportation system, comprising:
a vehicle; and
a vehicle trailer coupled to the vehicle, the vehicle trailer comprising:
a base coupled to the vehicle, the base having a set of base panels, each base panel of the set of base panels hingedly connected to an adjacent base panel of the set of base panels,
a trailer positioning assembly coupled to the vehicle, the trailer positioning assembly comprising:
a vertical frame having a first end coupled to the vehicle and an opposing second end, and
a trailer positioning mechanism disposed at the second end of the vertical frame, the trailer positioning mechanism comprising a tether coupled to at least one of a first base panel and a second base panel of the set of base panels in proximity to a hinged connection disposed between the first base panel and the second base panel; and
a trailer attachment assembly disposed between the first base panel of the base and the trailer positioning assembly, the trailer attachment assembly comprising a rotational joint having a first portion coupled to the vehicle and a second portion coupled to the first base panel of the set of base panels, the trailer attachment assembly configured to provide rotation of the first base panel about the rotational joint and within a vertical plane relative to the trailer positioning assembly,
the trailer positioning assembly configured to position the base between a first, expanded position relative to the vehicle, and a second, retracted position relative to the vehicle such that a bottom surface of the first panel of the set of base panels is disposed in opposing proximity to a bottom surface of an adjacent second panel of the set of base panels while the vehicle trailer is coupled to the vehicle.

14. The transportation system of claim 13, wherein the base further comprises a set of locking elements, each locking element of the set of locking elements disposed between adjacent panels of the set of panels.

15. The transportation system of claim 13, further comprising a first set of side panels hingedly coupled to the base, the first set of side panels comprising a first side panel disposed at a first end of the base and a second side panel disposed at an opposing second end of the base.

16. The transportation system of claim 15, further comprising a second set of side panels hingedly coupled to the base, the second set of side panels comprising a first set of subpanels disposed along a first side of the base and a second set of subpanels disposed along a second side of the base, each panel of the first set of subpanels hingedly coupled to an adjacent subpanel of the first set of subpanels, and each panel of the second set of subpanels hingedly coupled to an adjacent subpanel of the second set of subpanels.

17. The transportation system of claim 13, further comprising a first set of side panels removeably coupled to the base, the first set of side panels comprising a first side panel disposed at a first end of the base and a second side panel disposed at an opposing second end of the base.

18. The transportation system of claim 17, further comprising a second set of side panels removeably coupled to the base, the second set of side panels comprising a first set of subpanels disposed along a first side of the base and a second set of subpanels disposed along a second side of the base.

19. The transportation system of claim 18, further comprising a panel interlocking system having a set of panel interlocking mechanisms, each panel interlocking mechanism configured to secure at least one of adjacent subpanels of the first set of subpanels, adjacent subpanels of the second set of subpanels, subpanels of the first and second set subpanels to the adjacent first side panel, and subpanels of the first and second set subpanels to the adjacent second side panel.

20. The transportation system of claim 13, wherein the trailer positioning mechanism comprises a winch coupled to the second end of the vertical frame, the winch disposed in operational communication with the tether.

* * * * *